US012613724B2

(12) United States Patent
Xie et al.

(10) Patent No.: US 12,613,724 B2
(45) Date of Patent: Apr. 28, 2026

(54) CLUSTER DISTRIBUTED RESOURCE SCHEDULING METHOD, APPARATUS AND DEVICE, AND STORAGE MEDIUM

(71) Applicant: INSPUR ELECTRONIC INFORMATION INDUSTRY CO., LTD., Shandong (CN)

(72) Inventors: Yan Xie, Shandong (CN); Dong Zhang, Shandong (CN)

(73) Assignee: INSPUR ELECTRONIC INFORMATION INDUSTRY CO., LTD., Shandong (CN)

( * ) Notice: Subject to any disclaimer, the term of this patent is extended or adjusted under 35 U.S.C. 154(b) by 684 days.

(21) Appl. No.: 18/011,336

(22) PCT Filed: Feb. 19, 2021

(86) PCT No.: PCT/CN2021/076836
§ 371 (c)(1),
(2) Date: Dec. 19, 2022

(87) PCT Pub. No.: WO2021/253851
PCT Pub. Date: Dec. 23, 2021

(65) Prior Publication Data
US 2023/0305880 A1 Sep. 28, 2023

(30) Foreign Application Priority Data
Jun. 19, 2020 (CN) .......................... 202010567625.1

(51) Int. Cl.
*G06F 9/455* (2018.01)

(52) U.S. Cl.
CPC .. *G06F 9/45558* (2013.01); *G06F 2009/4557* (2013.01); *G06F 2009/45575* (2013.01)

(58) Field of Classification Search
CPC ....... G06F 9/45558; G06F 2009/45562; G06F 2009/45595; H04L 9/50; H04L 67/10
See application file for complete search history.

(56) References Cited

U.S. PATENT DOCUMENTS

| | | | |
|---|---|---|---|
| 10,055,248 B1 | 8/2018 | Tsirkin | |
| 2010/0242045 A1* | 9/2010 | Swamy | ................... G06F 9/455 718/1 |

(Continued)

FOREIGN PATENT DOCUMENTS

| | | |
|---|---|---|
| CN | 103605574 A | 2/2014 |
| CN | 103617076 A | 3/2014 |

(Continued)

OTHER PUBLICATIONS

Search report for International application No. PCT/CN2021/076836 mailed on May 17, 2021.

(Continued)

*Primary Examiner* — Kenneth Tang
(74) *Attorney, Agent, or Firm* — Dennemeyer & Associates LLC

(57) ABSTRACT

A cluster distributed resource scheduling method, apparatus and device, and a storage medium. The method includes: respectively acquiring host CPU utilization rates and vCPU utilization rates; respectively performing a quantization operation on the host CPU utilization rates and the vCPU utilization rates, to obtain host quantized pressure values and virtual machine quantized pressure values; acquiring historical host pressure values and historical virtual machine pressure values; according to the host quantified pressure values and historical host pressure values respectively corresponding to hosts, and virtual machine quantified pressure values and historical virtual machine pressure values respectively corresponding to virtual machines in the hosts, calculating target CPU pressure values respectively corre- (Continued)

Utilization rate acquisition module — 31

Quantized pressure value obtaining module — 32

Historical pressure value obtaining module — 33

Pressure value calculation module — 34

Virtual machine migration module — 35 sponding to the hosts; and performing a live migration operation on the virtual machines in the hosts according to the target CPU pressure values.

17 Claims, 3 Drawing Sheets

(56) References Cited

U.S. PATENT DOCUMENTS

| | | | | |
|---|---|---|---|---|
| 2010/0332658 A1* | 12/2010 | Elyashev | ................ | G06F 9/505 |
| | | | | 709/226 |
| 2014/0229949 A1 | 8/2014 | Cai | | |
| 2018/0287955 A1* | 10/2018 | Fitzgerald | ........... | H04L 41/0895 |
| 2019/0095233 A1* | 3/2019 | Iikura | ................... | G06F 9/5077 |
| 2021/0026707 A1* | 1/2021 | Rosenberg | ......... | G06F 9/45558 |
| 2021/0034407 A1* | 2/2021 | Tian | ................... | G06F 9/45558 |
| 2024/0078130 A1* | 3/2024 | Gopalan | ............ | G06F 9/45558 |

FOREIGN PATENT DOCUMENTS

| | | | |
|---|---|---|---|
| CN | 104536803 | A | 4/2015 |
| CN | 104714851 | A | 6/2015 |
| CN | 106201700 | A | 12/2016 |
| CN | 106250206 | A | 12/2016 |
| CN | 106293871 | A | 1/2017 |
| CN | 106970831 | A | 7/2017 |
| CN | 107295096 | A | 10/2017 |
| CN | 107506233 | A | 12/2017 |
| CN | 108667859 | A | 10/2018 |
| CN | 111858031 | A | 10/2020 |

OTHER PUBLICATIONS

Search report for Chinese office action 202010567625.1 filed on Jun. 19, 2020.

* cited by examiner

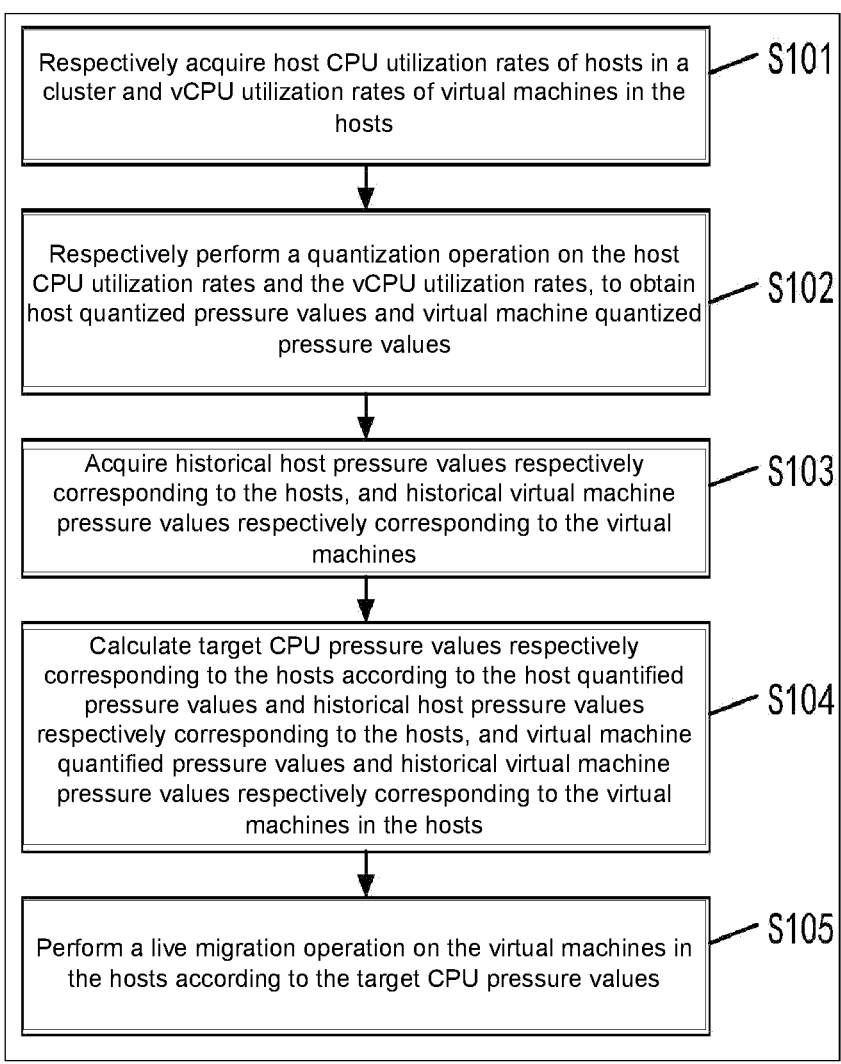

Respectively acquire host CPU utilization rates of hosts in a cluster and vCPU utilization rates of virtual machines in the hosts — S101

Respectively perform a quantization operation on the host CPU utilization rates and the vCPU utilization rates, to obtain host quantized pressure values and virtual machine quantized pressure values — S102

Acquire historical host pressure values respectively corresponding to the hosts, and historical virtual machine pressure values respectively corresponding to the virtual machines — S103

Calculate target CPU pressure values respectively corresponding to the hosts according to the host quantified pressure values and historical host pressure values respectively corresponding to the hosts, and virtual machine quantified pressure values and historical virtual machine pressure values respectively corresponding to the virtual machines in the hosts — S104

Perform a live migration operation on the virtual machines in the hosts according to the target CPU pressure values — S105

Fig. 1

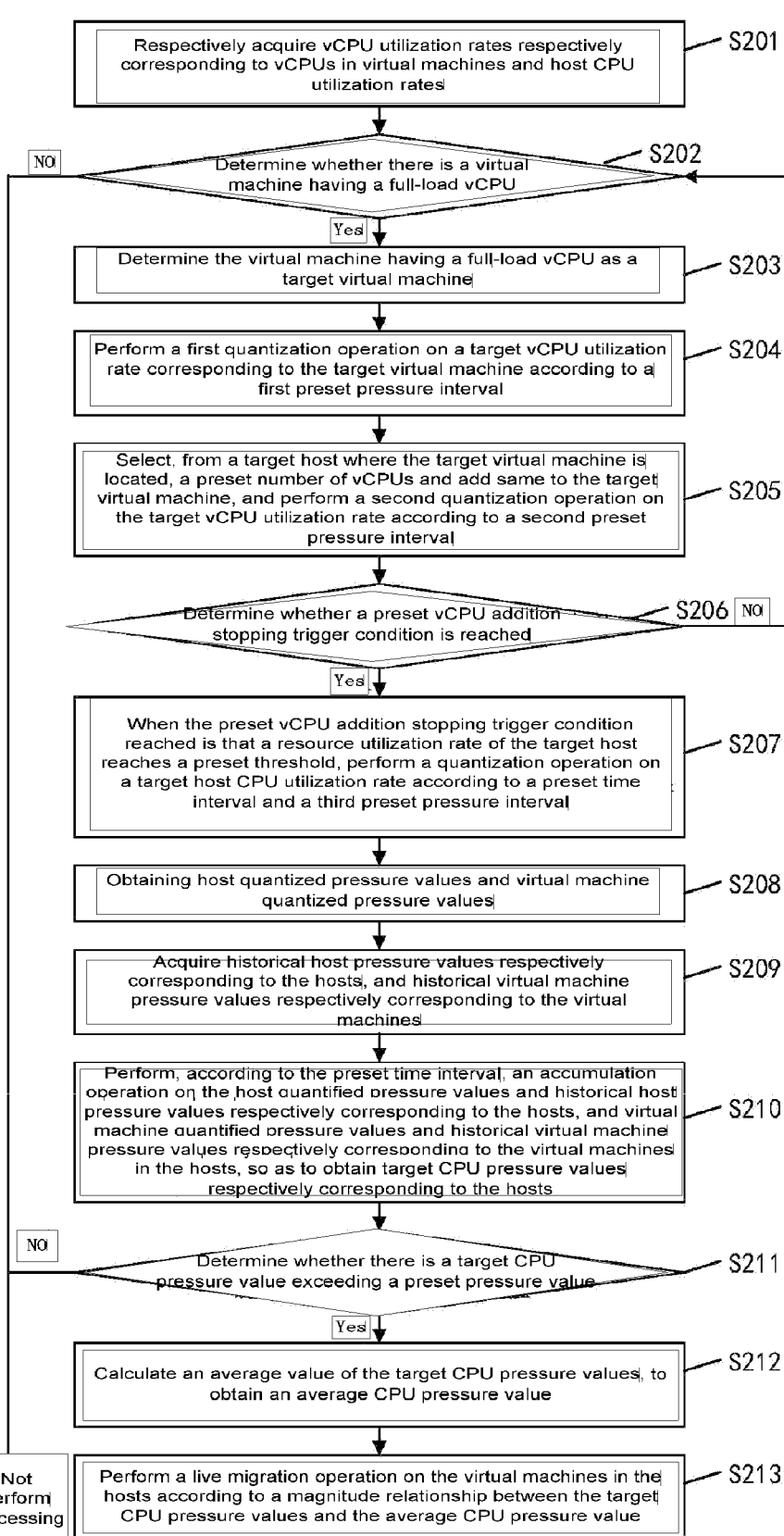

Respectively acquire vCPU utilization rates respectively corresponding to vCPUs in virtual machines and host CPU utilization rates — S201

Determine whether there is a virtual machine having a full-load vCPU — S202

NO

Yes

Determine the virtual machine having a full-load vCPU as a target virtual machine — S203

Perform a first quantization operation on a target vCPU utilization rate corresponding to the target virtual machine according to a first preset pressure interval — S204

Select, from a target host where the target virtual machine is located, a preset number of vCPUs and add same to the target virtual machine, and perform a second quantization operation on the target vCPU utilization rate according to a second preset pressure interval — S205

Determine whether a preset vCPU addition stopping trigger condition is reached — S206 NO Yes When the preset vCPU addition stopping trigger condition reached is that a resource utilization rate of the target host reaches a preset threshold, perform a quantization operation on a target host CPU utilization rate according to a preset time interval and a third preset pressure interval — S207

Obtaining host quantized pressure values and virtual machine quantized pressure values — S208

Acquire historical host pressure values respectively corresponding to the hosts, and historical virtual machine pressure values respectively corresponding to the virtual machines — S209

Perform, according to the preset time interval, an accumulation operation on the host quantified pressure values and historical host pressure values respectively corresponding to the hosts, and virtual machine quantified pressure values and historical virtual machine pressure values respectively corresponding to the virtual machines in the hosts, so as to obtain target CPU pressure values respectively corresponding to the hosts — S210

Determine whether there is a target CPU pressure value exceeding a preset pressure value — S211

NO

Yes

Calculate an average value of the target CPU pressure values, to obtain an average CPU pressure value — S212

Not perform processing

Perform a live migration operation on the virtual machines in the hosts according to a magnitude relationship between the target CPU pressure values and the average CPU pressure value — S213

Fig. 2

CLUSTER DISTRIBUTED RESOURCE SCHEDULING METHOD, APPARATUS AND DEVICE, AND STORAGE MEDIUM

CROSS-REFERENCE TO RELATED APPLICATION

The present disclosure claims priority to Chinese Patent Application No. 202010567625.1, filed to the China National Intellectual Property Administration on Jun. 19, 2020 and entitled "Cluster Distributed Resource Scheduling Method, Apparatus and Device, and Storage Medium", which is incorporated herein by reference in its entirety.

TECHNICAL FIELD

The present disclosure relates to the field of distributed storage technology, and in particular, to a cluster distributed resource scheduling method, apparatus and device, and a computer-readable storage medium.

BACKGROUND

Cluster distributed resource scheduler (DRS) is an important function of a virtualization platform, can evaluate resource pressure situations between hosts in real time, and schedule virtual machines in the cluster according to various indexes, so that resources of the hosts in the cluster can be utilized in a balanced manner, avoiding the risk that virtual machines cannot run normally or even get down due to insufficient resources of a certain host.

In an existing cluster distributed resource scheduling manner, central processing unit (CPU) resource utilization rates of all hosts in the cluster are evaluated in real time, and then virtual machines in hosts with high CPU resource utilization rates are transferred to hosts with low CPU resource utilization rates in the current cluster by means of live migration. The advantage of such a manner is that virtual machines with high CPU loads can be migrated to hosts with idle CPU resources in a timely manner according to real-time CPU utilization rates. However, if some virtual machines in the cluster have certain timed tasks, and these tasks will occupy a large amount of CPU resources in the execution process, in response to this, the CPU utilization rates of the virtual machines will periodically fluctuate, so that a distributed resource scheduling program will continually perform live migration on the virtual machines among various hosts in the cluster. Such frequent live migration of virtual machines has many data security risks, and also causes great pressure on network resources.

In conclusion, how to effectively solve the problems such as data security risks and high network resource pressure existing in the existing cluster distributed resource scheduling method is a problem that needs to be urgently solved by a person skilled in the art.

SUMMARY

An object of some embodiments of the present disclosure is to provide a cluster distributed resource scheduling method. The method reduces the pressure of network resources, and reduces the probability of memory data loss caused by frequent live migration of virtual machines. Another object of some embodiments of the present disclosure is to provide a cluster distributed resource scheduling apparatus and device, and a computer-readable storage medium.

In order to solve the described technical problems, some embodiments of the present disclosure provide the following technical solutions:

a cluster distributed resource scheduling method, including:

respectively acquiring host CPU utilization rates of hosts in a cluster and virtual CPU (vCPU) utilization rates of virtual machines in the hosts;

respectively performing a quantization operation on the host CPU utilization rates and the vCPU utilization rates, to obtain host quantized pressure values and virtual machine quantized pressure values;

acquiring historical host pressure values respectively corresponding to the hosts, and historical virtual machine pressure values respectively corresponding to the virtual machines;

calculating target CPU pressure values respectively corresponding to the hosts according to the host quantified pressure values and historical host pressure values respectively corresponding to the hosts, and virtual machine quantified pressure values and historical virtual machine pressure values respectively corresponding to the virtual machines in the hosts; and performing a live migration operation on the virtual machines in the hosts according to the target CPU pressure values.

In an embodiment of the present disclosure, respectively acquiring host CPU utilization rates of hosts in a cluster and vCPU utilization rates of virtual machines in the hosts includes:

respectively acquiring vCPU utilization rates respectively corresponding to vCPUs in the virtual machines and the host CPU utilization rates; and respectively performing a quantization operation on the host CPU utilization rates and the vCPU utilization rates includes:

determining whether there is a virtual machine having a full-load vCPU;

if so, determining the virtual machine having a full-load vCPU as a target virtual machine;

performing a first quantization operation on a target vCPU utilization rate corresponding to the target virtual machine according to a first preset pressure interval; selecting, from a target host where the target virtual machine is located, a preset number of vCPUs and adding same to the target virtual machine, and performing a second quantization operation on the target vCPU utilization rate according to a second preset pressure interval;

determining whether a preset vCPU addition stopping trigger condition is reached;

if not, repeatedly executing the step of performing a first quantization operation on a target vCPU utilization rate corresponding to the target virtual machine according to a first preset pressure interval; and if so, performing a quantization operation on a target host CPU utilization rate corresponding to the target host according to a third preset pressure interval when the preset vCPU addition stopping trigger condition reached is that a resource utilization rate of the target host reaches a preset threshold.

In an embodiment of the present disclosure, determining whether a resource utilization rate of the target host reaches a preset threshold includes:

determining whether the number of vCPUs in the target virtual machine to the total number of vCPUs in the target host reaches a preset proportion value.

In an embodiment of the present disclosure, determining whether a resource utilization rate of the target host reaches a preset threshold includes:

determining whether the target host CPU utilization rate reaches a preset utilization rate threshold.

In an embodiment of the present disclosure, performing a quantization operation on a target host CPU utilization rate corresponding to the target host according to a third preset pressure interval includes:

performing a quantization operation on the target host CPU utilization rate according to a preset time interval and the third preset pressure interval.

In an embodiment of the present disclosure, according to the host quantified pressure values and historical host pressure values respectively corresponding to the hosts, and virtual machine quantified pressure values and historical virtual machine pressure values respectively corresponding to the virtual machines in the hosts, calculating target CPU pressure values respectively corresponding to the hosts, includes:

performing, according to the preset time interval, an accumulation operation on the host quantified pressure values and historical host pressure values respectively corresponding to the hosts, and virtual machine quantified pressure values and historical virtual machine pressure values respectively corresponding to the virtual machines in the hosts, so as to obtain target CPU pressure values respectively corresponding to the hosts; and performing a live migration operation on the virtual machines in the hosts according to the target CPU pressure values includes:

determining whether there is a target CPU pressure value exceeding a preset pressure value;

if so, calculating an average value of the target CPU pressure values, to obtain an average CPU pressure value; and performing a live migration operation on the virtual machines in the hosts according to a magnitude relationship between the target CPU pressure values and the average CPU pressure value.

A cluster distributed resource scheduling apparatus, including:

a utilization rate acquisition module, configured to respectively acquire host CPU utilization rates of hosts in a cluster and vCPU utilization rates of virtual machines in the hosts;

a quantized pressure value obtaining module, configured to respectively perform a quantization operation on the host CPU utilization rates and the vCPU utilization rates, to obtain host quantized pressure values and virtual machine quantized pressure values;

a historical pressure value obtaining module, configured to acquire historical host pressure values respectively corresponding to the hosts, and historical virtual machine pressure values respectively corresponding to the virtual machines;

a pressure value calculation module, configured to according to the host quantified pressure values and historical host pressure values respectively corresponding to the hosts, and virtual machine quantified pressure values and historical virtual machine pressure values respectively corresponding to the virtual machines in the hosts, calculate target CPU pressure values respectively corresponding to the hosts; and a virtual machine migration module, configured to perform a live migration operation on the virtual machines in the hosts according to the target CPU pressure values.

In an embodiment of the present disclosure, the utilization rate acquisition module is specifically a module of respectively acquiring vCPU utilization rates respectively corresponding to vCPUs in the virtual machines and host CPU utilization rates; and the quantized pressure value obtaining module includes:

a first determination submodule, configured to determine whether there is a virtual machine having a full-load vCPU;

a target virtual machine determination submodule, configured to determine, when it is determined that there is a virtual machine with a 100% vCPU utilization rate, the virtual machine having a full-load vCPU as a target virtual machine;

a first quantization submodule, configured to perform a first quantization operation on a target vCPU utilization rate corresponding to the target virtual machine according to a first preset pressure interval;

a second quantization submodule, configured to select, from a target host where the target virtual machine is located, a preset number of vCPUs and add same to the target virtual machine, and perform a second quantization operation on the target vCPU utilization rate according to a second preset pressure interval;

a second determination submodule, configured to determine whether a preset vCPU addition stopping trigger condition is reached;

a repeated execution submodule, configured to when it is determined that the preset vCPU addition stopping trigger condition is not reached, repeatedly execute the step of performing a first quantization operation on a target vCPU utilization rate corresponding to the target virtual machine according to a first preset pressure interval; and a third quantization submodule, configured to perform a quantization operation on a target host CPU utilization rate corresponding to the target host according to a third preset pressure interval when it is determined that the preset vCPU addition stopping trigger condition is reached and the preset vCPU addition stopping trigger condition reached is that a resource utilization rate of the target host reaches a preset threshold.

A cluster distributed resource scheduling device, including:

a memory, configured to store a computer program; and a processor, configured to execute the computer program to implement the steps of the cluster distributed resource scheduling method as described above.

A computer-readable storage medium, the computer-readable storage medium having a computer program stored thereon, and the computer program being executed by the processor to implement the steps of the cluster distributed resource scheduling method as described above.

Some embodiments of the present disclosure provide a cluster distributed resource scheduling method: respectively acquiring host CPU utilization rates of hosts in a cluster and vCPU utilization rates of virtual machines in the hosts; respectively performing a quantization operation on the host CPU utilization rates and the vCPU utilization rates, to obtain host quantized pressure values and virtual machine quantized pressure values; acquiring historical host pressure values respectively corresponding to the hosts, and historical virtual machine pressure values respectively corresponding to the virtual machines; according to the host quantified pressure values and historical host pressure values respectively corresponding to the hosts, and virtual machine quantified pressure values and historical virtual machine pressure values respectively corresponding to the virtual machines in the hosts, calculating target CPU pressure values respectively corresponding to the hosts; and performing a live migration operation on the virtual machines in the hosts according to the target CPU pressure values.

From the technical solutions, it can be determined that by performing a quantization operation on vCPU utilization rates and host CPU utilization rates and integrating historical host pressure values corresponding to the hosts and historical virtual machine pressure values of virtual machines in the hosts, target CPU pressure values respectively corresponding to the hosts are calculated, along with the iterative execution of distributed resource scheduling, the CPU utilization rates of the hosts tend to be stable, thereby reducing the number of times of scheduling of live migration between hosts, relieving the pressure of network resources, and reducing the probability of memory data loss caused by frequent live migration of virtual machines.

Correspondingly, embodiments of the present disclosure further provide a cluster distributed resource scheduling apparatus and device corresponding to the described cluster distributed resource scheduling method, and a computer-readable storage medium, which have the described technical effects and are not repeated herein again.

BRIEF DESCRIPTION OF THE DRAWINGS

In order to describe the technical solutions in the embodiments of the present disclosure or in the prior art more clearly, hereinafter, accompanying drawings requiring to be used for describing the embodiments or the prior art are introduced briefly. Apparently, the accompanying drawings in the following description merely relate to some embodiments of the present disclosure, and for a person of ordinary skill in the art, other accompanying drawings can also be derived from these accompanying drawings without involving any inventive effort.

FIG. 1 is an implementation flowchart of a cluster distributed resource scheduling method according to embodiments of the present disclosure;

FIG. 2 is another implementation flowchart of a cluster distributed resource scheduling method according to embodiments of the present disclosure;

DETAILED DESCRIPTION OF THE EMBODIMENTS

Figure 3:
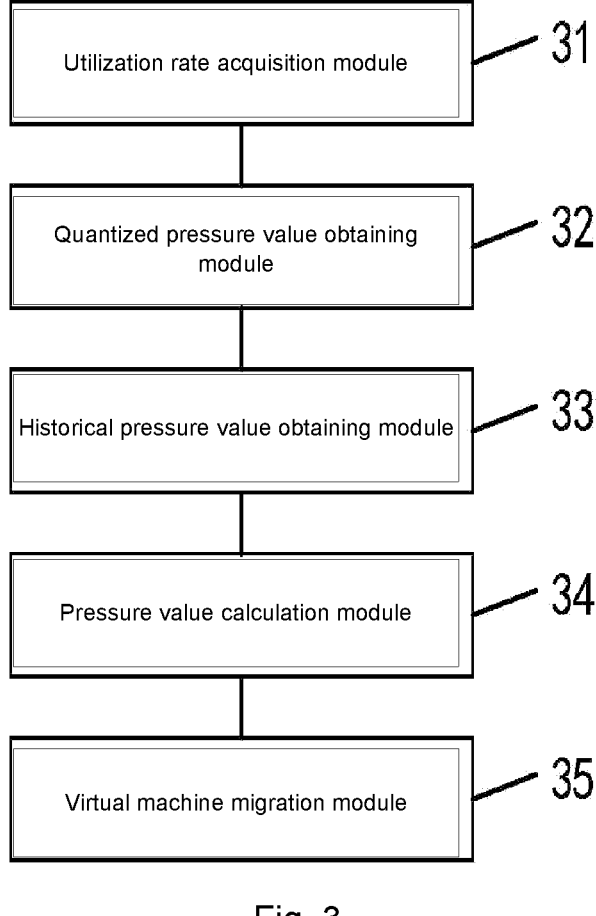
FIG. 3 is a structural block diagram of a cluster distributed resource scheduling apparatus according to embodiments of the present disclosure.

To make a person skilled in the art better understand the solutions of some embodiments of the present disclosure, some embodiments of the present disclosure are further described in detail with reference to the accompanying drawings and embodiments. Obviously, the embodiments as described are only parts of embodiments rather than all the embodiments of the present disclosure. All other embodiments obtained by a person of ordinary skill in the art on the basis of the embodiments of the present disclosure without any inventive effort shall all fall within the scope of protection of the present disclosure.

In some Embodiments:

Referring to FIG. 1, FIG. 1 is an implementation flowchart of a cluster distributed resource scheduling method according to embodiments of the present disclosure. The method may include the following steps:

S101: respectively acquiring host CPU utilization rates of hosts in a cluster and vCPU utilization rates of virtual machines in the hosts.

In the running process of hosts and virtual machines in the cluster, host CPU utilization rates of the hosts in the cluster and vCPU utilization rates of virtual machines in the hosts are respectively acquired.

S102: respectively performing a quantization operation on the host CPU utilization rates and the vCPU utilization rates, to obtain host quantized pressure values and virtual machine quantized pressure values.

After acquiring host CPU utilization rates of hosts in the cluster and vCPU utilization rates of virtual machines in the hosts, a quantization operation is respectively performed on the host CPU utilization rates and the vCPU utilization rates, to obtain host quantized pressure values and virtual machine quantized pressure values. Thus, resource usage situations of corresponding hosts are indicated by the host quantized pressure values, and CPU load situations of corresponding virtual machines are indicated by the virtual machine quantized pressure values.

S103: acquiring historical host pressure values respectively corresponding to the hosts, and historical virtual machine pressure values respectively corresponding to the virtual machines.

Historical host pressure values respectively corresponding to the hosts and historical virtual machine pressure values respectively corresponding to the virtual machines are pre-stored. Historical host pressure values respectively corresponding to the hosts and historical virtual machine pressure values respectively corresponding to the virtual machines are acquired.

S104: according to the host quantified pressure values and historical host pressure values respectively corresponding to the hosts, and virtual machine quantified pressure values and historical virtual machine pressure values respectively corresponding to the virtual machines in the hosts, calculating target CPU pressure values respectively corresponding to the hosts.

After obtaining the host quantized pressure values and the virtual machine quantized pressure values by means of the quantization operation and acquiring the historical host pressure values respectively corresponding to the hosts and the historical virtual machine pressure values respectively corresponding to the virtual machines, according to the host quantified pressure values and historical host pressure values respectively corresponding to the hosts, and virtual machine quantified pressure values and historical virtual machine pressure values respectively corresponding to the virtual machines in the hosts, target CPU pressure values respectively corresponding to the hosts are calculated. Specifically, corresponding target CPU pressure values can be obtained by performing an accumulation operation on a host quantized pressure value and a historical host pressure value corresponding to each host, and virtual machine quantized pressure values and historical virtual machine pressure values respectively corresponding to the virtual machines in the host.

S105: performing a live migration operation on the virtual machines in the hosts according to the target CPU pressure values.

After the target CPU pressure values respectively corresponding to the hosts are obtained, a live migration operation is performed on the virtual machines in the hosts according to the target CPU pressure values. In this way, virtual machines deployed in hosts with relatively large target CPU pressure values are migrated to hosts with relatively small target CPU pressure values, thereby achieving balanced CPU resources of the cluster. By quantifying historical CPU usage rates of the virtual machines and historical CPU usage rates of the hosts into certain numerical values, i.e. historical virtual machine pressure values and historical host pressure values, the historical virtual machine pressure values and the historical host pressure values participate in calculation of the target CPU pressure values of the hosts. Therefore, the historical CPU usage rates of the virtual machines and the hosts can both be taken into account each time distributed resource scheduling is performed, so that a scheduling program can exert the effect thereof to the greatest extent in a scenario in which the host CPU usage rates change periodically.

From the technical solutions, it can be determined that by performing a quantization operation on vCPU utilization rates and host CPU utilization rates and integrating historical host pressure values corresponding to the hosts and historical virtual machine pressure values of virtual machines in the hosts, target CPU pressure values respectively corresponding to the hosts are calculated, along with the iterative execution of distributed resource scheduling, the CPU utilization rates of the hosts tend to be stable, thereby reducing the number of times of scheduling of live migration between hosts, relieving the pressure of network resources, and reducing the probability of memory data loss caused by frequent live migration of virtual machines.

It should be noted that on the basis of Embodiment one, embodiments of the present disclosure further provide a corresponding improvement solution. In subsequent embodiments, regarding steps the same as or corresponding to those steps in Embodiment one, reference may be made to each other, and corresponding beneficial effects may also be referred to each other, which are not repeated again in the following improvement embodiments.

In some Embodiments:

Referring to FIG. 2, FIG. 2 is another implementation flowchart of a cluster distributed resource scheduling method according to embodiments of the present disclosure. The method may include the following steps:

S201: respectively acquiring vCPU utilization rates respectively corresponding to vCPUs in virtual machines and host CPU utilization rates.

In the running process of the hosts and the virtual machines in a cluster, virtual central processing unit (vCPU) utilization rates respectively corresponding to vCPUs in the virtual machines and host CPU utilization rates are respectively acquired.

S202: determining whether there is a virtual machine having a full-load vCPU, if so, executing step S203, and if not, not performing processing.

After vCPU utilization rates respectively corresponding to vCPUs in the virtual machines are acquired, it is determined whether there is a virtual machine having a full-load vCPU, that is, determining whether there is a virtual machine having 100% vCPU utilization rate. If so, it indicates that the current virtual machine is running an application with a high CPU load and is running at a full load, and the number of vCPUs of the current virtual machine may not meet the requirements of internal applications, and in response to this, step S203 is executed; and if not, it indicates that the current virtual machine can temporally meet the requirements of internal applications, and no processing needs to be performed.

S203: determining the virtual machine having a full-load vCPU as a target virtual machine.

If it is determined that there is a virtual machine having a full-load vCPU, the virtual machine having a full-load vCPU is determined as a target virtual machine.

S204: performing a first quantization operation on a target vCPU utilization rate corresponding to the target virtual machine according to a first preset pressure interval.

The first preset pressure interval for quantifying a corresponding vCPU utilization rate is preset upon detection that there is a virtual machine having a full-load vCPU, for example, the first preset pressure interval may be set to be +10, that is, upon detection that there is a virtual machine having a full-load vCPU, a CPU pressure value of the virtual machine is increased by 10. A first quantization operation is performed on a target vCPU utilization rate corresponding to the target virtual machine according to the first preset pressure interval.

S205: selecting, from a target host where the target virtual machine is located, a preset number of vCPUs and adding same to the target virtual machine, and performing a second quantization operation on the target vCPU utilization rate according to a second preset pressure interval.

The second preset pressure interval for quantifying the vCPU utilization rate when the load of the virtual machine is alleviated by adding vCPUs, for example, the second preset pressure interval may be set to be +20, that is, upon detection that there is a virtual machine having a full-load vCPU, two vCPUs are added to the virtual machine, and a CPU pressure value of the virtual machine is increased by 20. After it is determined that there is a target virtual machine having a full-load vCPU, a preset number of vCPUs are selected from a target host where the target virtual machine is located and added to the target virtual machine, that is, vCPU hot swap is performed, so as to expand the performance of the target virtual machine, and a second quantization operation is performed on the target vCPU utilization rate according to the second preset pressure interval.

S206: determining whether a preset vCPU addition stopping trigger condition is reached; if so, executing step S207, and if not, executing step S204.

A vCPU addition stopping trigger condition is preset; after a preset number of vCPUs are added to the target virtual machine, it is determined whether the preset vCPU addition stopping trigger condition is reached; and if so, step S207 is executed, and the determination as to whether the vCPU addition stopping trigger condition is reached can be performed once every five minutes. The vCPU addition stopping trigger condition may be that a resource utilization rate of the target host reaches a preset threshold, that is, the CPU utilization rate of the target host reaches a preset high utilization rate, or vCPUs are added to the target virtual machine for multiple times, so that the proportion of the number of vCPUs in the target virtual machine to the total number of vCPUs in the target host reaches a preset high proportion value. The vCPU addition stopping trigger condition may also be that there is no virtual machine having a full-load vCPU.

In an embodiment of the present disclosure, determining whether a resource utilization rate of the target host reaches a preset threshold includes:

determining whether the number of vCPUs in the target virtual machine to the total number of vCPUs in the target host reaches a preset proportion value.

A proportion value is preset, and by means of determining whether the number of vCPUs in the target virtual machine to the total number of vCPUs in the target host reaches a preset proportion value, it can be determined that whether the vCPU addition stopping trigger condition is reached. For example, the preset proportion value may be set to 80%.

In an embodiment of the present disclosure, determining whether a resource utilization rate of the target host reaches a preset threshold includes:

determining whether the target host CPU utilization rate reaches a preset utilization rate threshold.

A host CPU utilization rate threshold is preset, and by means of determining whether the target host CPU utilization rate reaches a preset utilization rate threshold, it can be determined that whether the preset vCPU addition stopping trigger condition is reached. For example, the preset utilization rate threshold may be set to 80%.

S207: when the preset vCPU addition stopping trigger condition reached is that a resource utilization rate of the target host reaches a preset threshold, performing a quantization operation on a target host CPU utilization rate according to a preset time interval and a third preset pressure interval.

The third preset pressure interval for quantifying a corresponding host CPU utilization rate is preset when the preset vCPU addition stopping trigger condition reached is that the resource utilization rate of the target host reaches a preset threshold, for example, the third preset pressure interval may be set to be +20, that is, when the preset vCPU addition stopping trigger condition is reached, a CPU pressure value of the host is increased by 20. When the preset vCPU addition stopping trigger condition reached is that the resource utilization rate of the target host reaches a preset threshold, a quantization operation is performed on the target host CPU utilization rate according to a preset time interval and the third preset pressure interval.

It should be noted that the preset time interval may be set and adjusted according to actual situations, which is not limited in the embodiments of the present disclosure, for example, may be set to one minute, that is, upon detection that the preset vCPU addition stopping trigger condition is reached, the target host CPU utilization rate is quantified once per minute.

S208: obtaining host quantized pressure values and virtual machine quantized pressure values.

S209: acquiring historical host pressure values respectively corresponding to the hosts, and historical virtual machine pressure values respectively corresponding to the virtual machines.

S210: performing, according to the preset time interval, an accumulation operation on the host quantified pressure values and historical host pressure values respectively corresponding to the hosts, and virtual machine quantified pressure values and historical virtual machine pressure values respectively corresponding to the virtual machines in the hosts, so as to obtain target CPU pressure values respectively corresponding to the hosts.

After obtaining the host quantized pressure values and the virtual machine quantized pressure values and acquiring the historical host pressure values respectively corresponding to the hosts and the historical virtual machine pressure values respectively corresponding to the virtual machines, according to the preset time interval, an accumulation operation is performed on the host quantified pressure values and historical host pressure values respectively corresponding to the hosts, and virtual machine quantified pressure values and historical virtual machine pressure values respectively corresponding to the virtual machines in the hosts, so as to obtain target CPU pressure values respectively corresponding to the hosts.

S211: determining whether there is a target CPU pressure value exceeding a preset pressure value; if so, executing step S212, and if not, not performing processing.

A reference pressure value is preset; after obtaining target CPU pressure values respectively corresponding to the hosts by means of the accumulation calculation, it is determined whether there is a target CPU pressure value exceeding the preset pressure value; if so, it indicates that there is a host with insufficient CPU resources, and continuing to execute step S212; and if not, it indicates that the CPU resources of the hosts in the cluster are temporarily sufficient, and no processing needs to be performed.

S212: calculating an average value of the target CPU pressure values, to obtain an average CPU pressure value.

When it is determined that there is a target CPU pressure value exceeding the preset pressure value, an average value of the target CPU pressure values is calculated, to obtain an average CPU pressure value.

S213: performing a live migration operation on the virtual machines in the hosts according to a magnitude relationship between the target CPU pressure values and the average CPU pressure value.

After target CPU pressure values respectively corresponding to the hosts are obtained by calculation and the average CPU pressure value of the hosts is obtained by calculation, a live migration operation is performed on the virtual machines in the hosts according to a magnitude relationship between the target CPU pressure values and the average CPU pressure value. Virtual machines deployed in hosts with relatively small target CPU pressure values are migrated to hosts with relatively large target CPU pressure values, thereby achieving balanced CPU resources of the cluster.

Corresponding to the method embodiments above, embodiments of the present disclosure further provide a cluster distributed resource scheduling apparatus. The cluster distributed resource scheduling apparatus described below and the cluster distributed resource scheduling methods as described above can be referred to each other in a corresponding manner.

Referring to FIG. 3, FIG. 3 is a structural block diagram of a cluster distributed resource scheduling apparatus according to embodiments of the present disclosure. The apparatus may include:

a utilization rate acquisition module 31, configured to respectively acquire host CPU utilization rates of hosts in a cluster and vCPU utilization rates of virtual machines in the hosts;

a quantized pressure value obtaining module 32, configured to respectively perform a quantization operation on the host CPU utilization rates and the vCPU utilization rates, to obtain host quantized pressure values and virtual machine quantized pressure values;

a historical pressure value obtaining module 33, configured to acquire historical host pressure values respectively corresponding to the hosts, and historical virtual machine pressure values respectively corresponding to the virtual machines;

a pressure value calculation module 34, configured to according to the host quantified pressure values and historical host pressure values respectively corresponding to the hosts, and virtual machine quantified pressure values and historical virtual machine pressure values respectively corresponding to the virtual machines in the hosts, calculate target CPU pressure values respectively corresponding to the hosts; and a virtual machine migration module 35, configured to perform a live migration operation on the virtual machines in the hosts according to the target CPU pressure values.

From the technical solutions, it can be determined that by performing a quantization operation on vCPU utilization rates and host CPU utilization rates and integrating historical host pressure values corresponding to the hosts and historical virtual machine pressure values of virtual machines in the hosts, target CPU pressure values respectively corresponding to the hosts are calculated, along with the iterative execution of distributed resource scheduling, the CPU utilization rates of the hosts tend to be stable, thereby reducing the number of times of scheduling of live migration between hosts, relieving the pressure of network resources, and reducing the probability of memory data loss caused by frequent live migration of virtual machines.

In an embodiment of the present disclosure, the utilization rate acquisition module 31 is specifically a module of respectively acquiring vCPU utilization rates respectively corresponding to vCPUs in the virtual machines and host CPU utilization rates; and the quantized pressure value obtaining module 32 includes:

a first determination submodule, configured to determine whether there is a virtual machine having a full-load vCPU;

a target virtual machine determination submodule, configured to when it is determined that there is a virtual machine having a full-load vCPU, determine the virtual machine having a full-load vCPU as a target virtual machine;

a first quantization submodule, configured to perform a first quantization operation on a target vCPU utilization rate corresponding to the target virtual machine according to a first preset pressure interval;

a second quantization submodule, configured to select, from a target host where the target virtual machine is located, a preset number of vCPUs and add same to the target virtual machine, and perform a second quantization operation on the target vCPU utilization rate according to a second preset pressure interval;

a second determination submodule, configured to determine whether a preset vCPU addition stopping trigger condition is reached;

a repeated execution submodule, configured to repeatedly execute, when it is determined that the preset vCPU addition stopping trigger condition is not reached, the step of performing a first quantization operation on a target vCPU utilization rate corresponding to the target virtual machine according to a first preset pressure interval; and a third quantization submodule, configured to perform a quantization operation on a target host CPU utilization rate corresponding to the target host according to a third preset pressure interval when it is determined that the preset vCPU addition stopping trigger condition is reached and the preset vCPU addition stopping trigger condition reached is that a resource utilization rate of the target host reaches a preset threshold.

In an embodiment of the present disclosure, the third quantization submodule includes a determination unit, the determination unit is configured to determine whether the number of vCPUs in the target virtual machine to the total number of vCPUs in the target host reaches a preset proportion value.

In an embodiment of the present disclosure, the third quantization submodule includes a determination unit, the determination unit is configured to determine whether the target host CPU utilization rate reaches a preset utilization rate threshold.

In an embodiment of the present disclosure, the third quantization submodule is specifically a module of performing a quantization operation on the target host CPU utilization rate according to a preset time interval and the third preset pressure interval.

In an embodiment of the present disclosure, the pressure value calculation module 34 is specifically a module of performing, according to the preset time interval, an accumulation operation on the host quantified pressure values and historical host pressure values respectively corresponding to the hosts, and virtual machine quantified pressure values and historical virtual machine pressure values respectively corresponding to the virtual machines in the hosts, so as to obtain target CPU pressure values respectively corresponding to the hosts; and the virtual machine migration module 35 includes:

a third determination submodule, configured to determine whether there is a target CPU pressure value exceeding a preset pressure value;

an average value calculation submodule, configured to when it is determined that there is a target CPU pressure value exceeding the preset pressure value, calculate an average value of the target CPU pressure values, to obtain an average CPU pressure value; and a virtual machine migration submodule, configured to perform a live migration operation on the virtual machines in the hosts according to a magnitude relationship between the target CPU pressure values and the average CPU pressure value.

Figure 4:
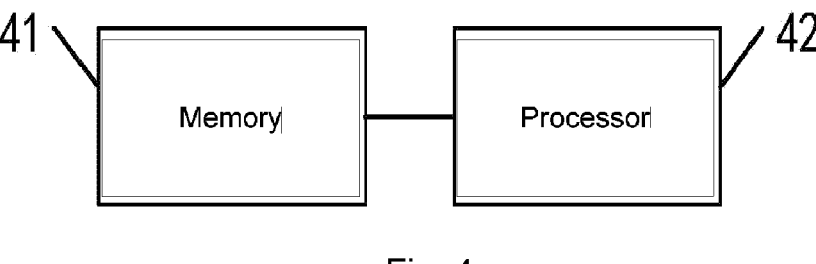
FIG. 4 is a structural block diagram of a cluster distributed resource scheduling device according to embodiments of the present disclosure.

Corresponding to the method embodiments above, referring to FIG. 4, FIG. 4 is a schematic diagram of a device provided by some embodiments of the present disclosure. The device may include:

a memory 41, configured to store a computer program; and a processor 42, configured to execute the computer program stored in the memory 41 to implement the following steps:

respectively acquiring host CPU utilization rates of hosts in a cluster and vCPU utilization rates of virtual machines in the hosts; respectively performing a quantization operation on the host CPU utilization rates and the vCPU utilization rates, to obtain host quantized pressure values and virtual machine quantized pressure values; acquiring historical host pressure values respectively corresponding to the hosts, and historical virtual machine pressure values respectively corresponding to the virtual machines; according to the host quantified pressure values and historical host pressure values respectively corresponding to the hosts, and virtual machine quantified pressure values and historical virtual machine pressure values respectively corresponding to the virtual machines in the hosts, calculating target CPU pressure values respectively corresponding to the hosts; and performing a live migration operation on the virtual machines in the hosts according to the target CPU pressure values.

For an introduction of the device provided in some embodiments of the present disclosure, referring to the method embodiments above, and they are not further repeated herein in some embodiments of the present disclosure.

Corresponding to the method embodiments above, some embodiments of the present disclosure further provide a computer-readable storage medium, the computer-readable storage medium having a computer program stored thereon, wherein when the computer program is executed by the processor, the following steps can be implemented:

respectively acquiring host CPU utilization rates of hosts in a cluster and vCPU utilization rates of virtual machines in the hosts; respectively performing a quantization operation on the host CPU utilization rates and the vCPU utilization rates, to obtain host quantized pressure values and virtual machine quantized pressure values; acquiring historical host pressure values respectively corresponding to the hosts, and historical virtual machine pressure values respectively corresponding to the virtual machines; according to the host quantified pressure values and historical host pressure values respectively corresponding to the hosts, and virtual machine quantified pressure values and historical virtual machine pressure values respectively corresponding to the virtual machines in the hosts, calculating target CPU pressure values respectively corresponding to the hosts; and performing a live migration operation on the virtual machines in the hosts according to the target CPU pressure values.

The computer-readable storage medium may include: various media that can store program codes, such as a USB flash disk, a Read-Only Memory (ROM), a Random Access Memory (RAM), a removable hard disk, a magnetic disk, or an optical disc.

For the introduction of the computer-readable storage medium provided by some embodiments of the present disclosure, reference may be made to the method embodiments above, and details are not repeated in some embodiments of the present disclosure.

The embodiments in the present description are described in a progressive manner. Each embodiment focuses on differences from other embodiments. For the same or similar parts among the embodiments, reference may be made to each other. For the apparatus, device and computer-readable storage medium disclosed in the embodiments, as they correspond to the methods disclosed in the embodiments, the illustration thereof is relatively simple, and for the relevant parts, reference can be made to the illustration of the method parts.

The principle and embodiments of the present disclosure are described herein through specific examples, and the description of the embodiments above is only used to help understand the technical solutions and core ideas of some embodiments of the present disclosure. It should be noted that for a person of ordinary skill in the art, several modifications and improvements can be made to some embodiments of the present disclosure without departing from the principle of some embodiments of the present disclosure. These improvements and modifications also fall within the scope of protection of the claims of the present disclosure.

What is claimed is:

1. A cluster distributed resource scheduling method, comprising:

respectively acquiring host CPU utilization rates of hosts in a cluster and virtual CPU (vCPU) utilization rates of virtual machines in the hosts;

respectively performing a quantization operation on the host CPU utilization rates and the vCPU utilization rates, to obtain host quantized pressure values and virtual machine quantized pressure values;

acquiring historical host pressure values respectively corresponding to the hosts, and historical virtual machine pressure values respectively corresponding to the virtual machines;

calculating target CPU pressure values respectively corresponding to the hosts according to the host quantified pressure values and historical host pressure values respectively corresponding to the hosts, and virtual machine quantified pressure values and historical virtual machine pressure values respectively corresponding to the virtual machines in the hosts; and performing a live migration operation on the virtual machines in the hosts according to the target CPU pressure values;

wherein respectively acquiring host CPU utilization rates of hosts in a cluster and vCPU utilization rates of virtual machines in the hosts comprises:

respectively acquiring vCPU utilization rates respectively corresponding to vCPUs in the virtual machines and the host CPU utilization rates; and respectively performing a quantization operation on the host CPU utilization rates and the vCPU utilization rates includes:

determining whether there is a virtual machine having a full load vCPU;

when there is a virtual machine having a full-load vCPU, determining the virtual machine having a full load vCPU as a target virtual machine;

performing a first quantization operation on a target vCPU utilization rate corresponding to the target virtual machine according to a first preset pressure interval;

selecting, from a target host where the target virtual machine is located, a preset number of vCPUs and adding same to the target virtual machine, and performing a second quantization operation on the target vCPU utilization rate according to a second preset pressure interval;

determining whether a preset vCPU addition stopping trigger condition is reached;

when the preset vCPU addition stopping trigger condition is not reached, repeatedly executing the step of performing a first quantization operation on a target vCPU utilization rate corresponding to the target virtual machine according to a first preset pressure interval; and when the preset vCPU addition stopping trigger condition is reached, performing a quantization operation on a target host CPU utilization rate corresponding to the target host according to a third preset pressure interval when the preset vCPU addition stopping trigger condition reached is that a resource utilization rate of the target host reaches a preset threshold.

2. The cluster distributed resource scheduling method according to claim 1, wherein determining whether a resource utilization rate of the target host reaches a preset threshold comprises:

determining whether the number of vCPUs in the target virtual machine to the total number of vCPUs in the target host reaches a preset proportion value.

3. The cluster distributed resource scheduling method according to claim 1, wherein determining whether a resource utilization rate of the target host reaches a preset threshold comprises:

determining whether the target host CPU utilization rate reaches a preset utilization rate threshold.

4. The cluster distributed resource scheduling method according to claim 1, wherein performing a quantization operation on a target host CPU utilization rate corresponding to the target host according to a third preset pressure interval comprises:

performing a quantization operation on the target host CPU utilization rate according to a preset time interval and the third preset pressure interval.

5. The cluster distributed resource scheduling method according to claim 4, wherein according to the host quantified pressure values and historical host pressure values respectively corresponding to the hosts, and virtual machine quantified pressure values and historical virtual machine pressure values respectively corresponding to the virtual machines in the hosts, calculating target CPU pressure values respectively corresponding to the hosts, comprises:

performing, according to the preset time interval, an accumulation operation on the host quantified pressure values and historical host pressure values respectively corresponding to the hosts, and virtual machine quantified pressure values and historical virtual machine pressure values respectively corresponding to the virtual machines in the hosts, so as to obtain target CPU pressure values respectively corresponding to the hosts; and performing a live migration operation on the virtual machines in the hosts according to the target CPU pressure values comprises:

determining whether there is a target CPU pressure value exceeding a preset pressure value;

when there is a target CPU pressure value exceeding a preset pressure value, calculating an average value of the target CPU pressure values, to obtain an average CPU pressure value; and performing a live migration operation on the virtual machines in the hosts according to a magnitude relationship between the target CPU pressure values and the average CPU pressure value.

6. The cluster distributed resource scheduling method according to claim 5, wherein performing a live migration operation on the virtual machines in the hosts comprises:

Migrating virtual machines deployed in hosts with relatively small target CPU pressure values to hosts with relatively large target CPU pressure values, so as to balance CPU resources of the cluster.

7. The cluster distributed resource scheduling method according to claim 1, wherein the third preset pressure interval is larger than the second preset pressure interval, the second preset pressure interval is larger than the first preset pressure interval.

8. A cluster distributed resource scheduling device, comprising:

a memory, configured to store a computer program; and a processor, configured to execute the computer program to:

respectively acquire host CPU utilization rates of hosts in a cluster and virtual CPU (vCPU) utilization rates of virtual machines in the hosts;

respectively perform a quantization operation on the host CPU utilization rates and the vCPU utilization rates, to obtain host quantized pressure values and virtual machine quantized pressure values;

acquire historical host pressure values respectively corresponding to the hosts, and historical virtual machine pressure values respectively corresponding to the virtual machines;

calculate target CPU pressure values respectively corresponding to the hosts according to the host quantified pressure values and historical host pressure values respectively corresponding to the hosts, and virtual machine quantified pressure values and historical virtual machine pressure values respectively corresponding to the virtual machines in the hosts; and perform a live migration operation on the virtual machines in the hosts according to the target CPU pressure values;

wherein the processor is further configured to:

respectively acquire vCPU utilization rates respectively corresponding to vCPUs in the virtual machines and the host CPU utilization rates; and respectively perform a quantization operation on the host CPU utilization rates and the vCPU utilization rates includes:

determine whether there is a virtual machine having a full load vCPU, when there is a virtual machine having a full-load vCPU, determine the virtual machine having a full load vCPU as a target virtual machine;

perform a first quantization operation on a target vCPU utilization rate corresponding to the target virtual machine according to a first preset pressure interval;

select, from a target host where the target virtual machine is located, a preset number of vCPUs and add same to the target virtual machine, and perform a second quantization operation on the target vCPU utilization rate according to a second preset pressure interval;

determine whether a preset vCPU addition stopping trigger condition is reached;

when the preset vCPU addition stopping trigger condition is not reached, repeatedly execute the step of performing a first quantization operation on a target vCPU utilization rate corresponding to the target virtual machine according to a first preset pressure interval; and when the preset vCPU addition stopping trigger condition is reached, perform a quantization operation on a target host CPU utilization rate corresponding to the target host according to a third preset pressure interval when the preset vCPU addition stopping trigger condition reached is that a resource utilization rate of the target host reaches a preset threshold.

9. The cluster distributed resource scheduling device according to claim 8, wherein the processor is further configured to:

determine whether the number of vCPUs in the target virtual machine to the total number of vCPUs in the target host reaches a preset proportion value.

10. The cluster distributed resource scheduling device according to claim 8, wherein the processor is further configured to:

determine whether the target host CPU utilization rate reaches a preset utilization rate threshold.

11. The cluster distributed resource scheduling device according to claim 8, wherein the processor is further configured to:

perform a quantization operation on the target host CPU utilization rate according to a preset time interval and the third preset pressure interval.

12. The cluster distributed resource scheduling device according to claim 11, wherein the processor is further configured to:

perform, according to the preset time interval, an accumulation operation on the host quantified pressure values and historical host pressure values respectively corresponding to the hosts, and virtual machine quantified pressure values and historical virtual machine pressure values respectively corresponding to the virtual machines in the hosts, so as to obtain target CPU pressure values respectively corresponding to the hosts; and perform a live migration operation on the virtual machines in the hosts according to the target CPU pressure values comprises:

determine whether there is a target CPU pressure value exceeding a preset pressure value;

when there is a target CPU pressure value exceeding a preset pressure value, calculate an average value of the target CPU pressure values, to obtain an average CPU pressure value; and perform a live migration operation on the virtual machines in the hosts according to a magnitude relationship between the target CPU pressure values and the average CPU pressure value.

13. The cluster distributed resource scheduling device according to claim 8, wherein the third preset pressure interval is larger than the second preset pressure interval, the second preset pressure interval is larger than the first preset pressure interval.

14. A non-transitory computer-readable storage medium storing a computer program that, when executed by a processor, cause the processor to:

respectively acquire host CPU utilization rates of hosts in a cluster and virtual CPU (vCPU) utilization rates of virtual machines in the hosts;

respectively perform a quantization operation on the host CPU utilization rates and the vCPU utilization rates, to obtain host quantized pressure values and virtual machine quantized pressure values;

acquire historical host pressure values respectively corresponding to the hosts, and historical virtual machine pressure values respectively corresponding to the virtual machines;

calculate target CPU pressure values respectively corresponding to the hosts according to the host quantified pressure values and historical host pressure values respectively corresponding to the hosts, and virtual machine quantified pressure values and historical virtual machine pressure values respectively corresponding to the virtual machines in the hosts; and perform a live migration operation on the virtual machines in the hosts according to the target CPU pressure values;

when the computer program is executed by the processor cause the processor further to:

respectively acquire vCPU utilization rates respectively corresponding to vCPUs in the virtual machines and the host CPU utilization rates; and respectively perform a quantization operation on the host CPU utilization rates and the vCPU utilization rates includes:

determine whether there is a virtual machine having a full-load vCPU;

when there is a virtual machine having a full-load vCPU, determine the virtual machine having a full-load vCPU as a target virtual machine;

perform a first quantization operation on a target vCPU utilization rate corresponding to the target virtual machine according to a first preset pressure interval;

select, from a target host where the target virtual machine is located, a preset number of vCPUs and add same to the target virtual machine, and perform a second quantization operation on the target vCPU utilization rate according to a second preset pressure interval;

determine whether a preset vCPU addition stopping trigger condition is reached;

when the preset vCPU addition stopping trigger condition is not reached, repeatedly execute the step of performing a first quantization operation on a target vCPU utilization rate corresponding to the target virtual machine according to a first preset pressure interval; and when the preset vCPU addition stopping trigger condition is reached, perform a quantization operation on a target host CPU utilization rate corresponding to the target host according to a third preset pressure interval when the preset vCPU addition stopping trigger condition reached is that a resource utilization rate of the target host reaches preset threshold.

15. The non-transitory computer-readable storage medium according to claim 14, when the computer program is executed by the processor cause the processor further to:

determine whether the number of vCPUs in the target virtual machine to the total number of vCPUs in the target host reaches a preset proportion value.

16. The non-transitory computer-readable storage medium according to claim 14, when the computer program is executed by the processor cause the processor further to:

determine whether the target host CPU utilization rate reaches a preset utilization rate threshold.

17. The non-transitory computer-readable storage medium according to claim 14, when the computer program is executed by the processor cause the processor further to:

perform a quantization operation on the target host CPU utilization rate according to a preset time interval and the third preset pressure interval.

* * * * *